(12) United States Patent
Kobayashi et al.

(10) Patent No.: US 8,161,056 B2
(45) Date of Patent: Apr. 17, 2012

(54) DATABASE CONSTRUCTING APPARATUS AND METHOD

(75) Inventors: Masahiko Kobayashi, Hamamatsu (JP);
Shinichi Takenaga, Hamamatsu (JP);
Tetsuya Maeda, Schenefeld (DE); Toru Makino, Hamamatsu (JP); Hitoshi Makita, Iwata (JP); Hiroshi Adachi, Hamamatsu (JP)

(73) Assignee: Yamaha Corporation (JP)

( * ) Notice: Subject to any disclaimer, the term of this patent is extended or adjusted under 35 U.S.C. 154(b) by 347 days.

(21) Appl. No.: 12/052,466

(22) Filed: Mar. 20, 2008

(65) Prior Publication Data
US 2008/0229910 A1    Sep. 25, 2008

(30) Foreign Application Priority Data
Mar. 22, 2007  (JP) ................................. 2007-074541

(51) Int. Cl.
*G06F 17/30* (2006.01)
(52) U.S. Cl. ........ 707/755; 707/600; 707/661; 707/706; 707/736; 705/500; 709/203
(58) Field of Classification Search .................. None
See application file for complete search history.

(56) References Cited

U.S. PATENT DOCUMENTS

| | | | | |
|---|---|---|---|---|
| 5,913,204 A * | 6/1999 | Kelly | ............................ | 705/500 |
| 6,539,395 B1 * | 3/2003 | Gjerdingen et al. | ................... | 1/1 |
| 6,605,770 B2 * | 8/2003 | Yamane et al. | ................. | 84/609 |
| 7,227,071 B2 * | 6/2007 | Tagawa et al. | ................... | 84/601 |
| 7,313,591 B2 * | 12/2007 | Eames et al. | ................... | 709/203 |
| 7,629,529 B2 * | 12/2009 | Makino | ............................ | 84/615 |
| 2002/0172372 A1 * | 11/2002 | Tagawa et al. | ................... | 381/56 |
| 2004/0003706 A1 * | 1/2004 | Tagawa et al. | ................... | 84/609 |
| 2004/0267736 A1 * | 12/2004 | Yamane et al. | .................... | 707/3 |
| 2005/0034065 A1 * | 2/2005 | Weight | ........................ | 715/513 |
| 2005/0092161 A1 * | 5/2005 | Urata | ............................... | 84/616 |
| 2005/0120868 A1 * | 6/2005 | Hinman et al. | ................. | 84/615 |
| 2006/0271620 A1 * | 11/2006 | Beaty et al. | ..................... | 709/203 |
| 2007/0106646 A1 * | 5/2007 | Stern et al. | ......................... | 707/3 |
| 2007/0179835 A1 * | 8/2007 | Ott et al. | ......................... | 705/10 |

(Continued)

FOREIGN PATENT DOCUMENTS

JP      2003-108563 A      4/2003

OTHER PUBLICATIONS

Brian Whitman et al, "Combining Musical and Cultural Features for Intelligent Style Detection", IRCAM, 2002.*

(Continued)

*Primary Examiner* — Hung Le
(74) *Attorney, Agent, or Firm* — Rossi, Kimms & McDowell LLP

(57) ABSTRACT

In a music information database, music information where music pieces and impression words representing impressions of the music pieces and usable as search words when any of the music pieces is to be searched for is registered for a plurality of music pieces. Information collection section collects, from among various information being provided by information source sites, information usable as music-piece-related search words. Registration section registers the words usable as music-piece-related search words, collected by the information collection section, into the database in association with particular music pieces. In this way, it is possible to construct a music information database which permits a music information search therethrough using impression words representing impressions of a music piece, at low cost without taking much time and labor.

21 Claims, 4 Drawing Sheets

U.S. PATENT DOCUMENTS

2007/0282887 A1* 12/2007 Fischer et al. ............... 707/102
2008/0016081 A1* 1/2008 MacMillan et al. ............ 707/10
2008/0189354 A1* 8/2008 Narasimhan et al. ......... 709/203

OTHER PUBLICATIONS

Brian Whitman et al, "Inferring Descriptions and Similarity for Music from Community Metadata", MIT Media Lab, Music, Mind and Machine Group, 2002.*

William C Cohen et al, "Web-Collaborative Filtering: Recommending Music by Spidering the Web", AT&T Shannon Laboratories, 2000.*

Andreas Rauber et al, "Automatically Analyzing and Organizing Music Archives", in Proceedings of the European Conference on Research and Advanced Technology for Digital Libraries, 2001.*

* cited by examiner

| TITLE | ARTIST'S NAME | SCENE | SEASON | TIME ZONE | FEELING |
|---|---|---|---|---|---|
| MUSIC PIECE 1 | ARTIST 1 | DRIVE, DATE | SUMMER | EVENING | COMFORTABLE |
| MUSIC PIECE 2 | ARTIST 1 | ATHLETIC MEET | SPRING, AUTUMN | MORNING, AFTERNOON | PLEASANT |
| : | : | : | : | : | : |
| MUSIC PIECE N | ARTIST M | WEDDING CEREMONY | SPRING, SUMMER, AUTUMN, WINTER | MORNING, AFTERNOON | HAPPY |

<LET ME KNOW>

QUESTION: LET ME KNOW IF THERE IS ANY MUSIC PIECE OR ALBUM
MATCHING THE FOLLOWING CONDITIONS FOR WINTER DRIVE.

·RECENT MUSIC
·FORWARD-LOOKING MUSIC, NOT FAREWELL MUSIC.
MY RECENT FAVORITE IS "bbbb" OF AAAA

———

ANSWER: OUR RECOMMENDATIONS ARE "dddd" OF CCCC, & "ffff"
OF EEEE.
YOU WILL BE IN LIVELY ATMOSPHERE.

FIG. 4A

<LET ME KNOW>

QUESTION:| LET ME | KNOW | IF THERE IS | ANY | MUSIC PIECE | OR | ALBUM |
MATCHING | THE FOLLOWING | CONDITIONS | FOR | WINTER | DRIVE. |

·RECENT | MUSIC
·FORWARD-LOOKING | MUSIC, | NOT | FAREWELL | MUSIC.|
| MY | RECENT | FAVORITE | IS | "bbbb" | OF | AAAA

———

ANSWER:| OUR | RECOMMENDATIONS | ARE | "dddd" | OF | CCCC, | & | "ffff" |
OF | EEEE.
YOU | WILL | BE | IN | LIVELY | ATMOSPHERE. |

FIG. 4B

DATABASE CONSTRUCTING APPARATUS AND METHOD

BACKGROUND

The present invention relates generally to database constructing apparatus for building or constructing a music information database which permits a search therethrough for desired music information, and more particularly to an improved database constructing apparatus and method for constructing a database which allows a user to search therethrough for desired music information using impression words representing impressions of a music piece.

In recent years, it has been a common practice to use a music-information providing site on the Internet to acquire audio data that are to be used for music reproduction on a music playback or reproduction device, automatic performance data (MIDI data) that are to be used for an automatic performance on an electronic musical instrument or the like, or music piece data, such as musical score data. Generally, such music-information providing sites are provided with a search function for users to search for music information corresponding to their desired music piece data. The search function is a function for receiving a search condition entered by a user to specify a desired item of music information and extracting all items of music information, corresponding to the entered search condition, from the database having stored therein among a multiplicity of items of music information stored in the database. Generally, the title, artist's names (e.g., singer's names), etc. of the user-desired music piece are used as the search condition. In the music information databases having the search function using titles and/or artist's names of user-desired music pieces as a search condition, there are registered, for a plurality of music pieces, music information where the titles and artist's names of the music pieces are associated with any music information corresponding to a user-entered search condition (at least one of the music title and artist's name) can be extracted from the database. The music information thus extracted is presented to the user as a search result based on the user-entered search condition. The aforementioned music information search scheme, which uses titles and/or artist's names of user-desired music pieces as a search condition, is designed to extract particular music pieces of titles corresponding to the user-entered search condition or music items of particular artists corresponding to the user-entered search condition.

There has also been known a search scheme which uses, as a search condition, impression words representing a desired music piece and searches for music pieces corresponding to the designated impression words. The "impression words" of a music piece express or represent impressions, such as "cheery" and "solemn", which the music piece gives a listener. Such a music search scheme using one or more impression words is advantageous in that it can find one or more music pieces matching a user-desired image. To realize the music information search function using one or more impression words, items of music piece information of a plurality of music pieces, in each of which the music piece and impression words representing the music pieces are associated with each other, are pre-registered in the music information database; in this way, all music pieces matching impression words, designated as a search condition, can be searched for and extracted from the music information database, as disclosed in for example Japanese Patent Application Laid-open Publication No. 2003-108563.

In order to construct a database capable of music information searches using impression words, it is necessary to define in advance impression words representing a multiplicity of music pieces. According to the prior art technique disclosed in the above-mentioned No. 2003-108563 publication, a database is constructed generally in the following manner. (1) Subjects (i.e., human subjects) are caused to listen to music pieces to be stored into the database, (2) the human subjects are asked to select impression words, which the subjects consider suitable to express the music pieces they have listened to, and (3) the results of the impression word selection by the human subjects are analyzed and the music pieces and the selected impression words are registered in association with each other, to thereby construct the database.

However, with the prior art technique disclosed in the above-mentioned No. 2003-108563, which requires the human subjects to listen to music pieces and select impression words from a list of impression words in advance; thus, if information of an enormous number of music pieces is to be stored into the database, heavy burdens tend to be imposed on the human subjects, which would present the inconvenience that costs, such as labor costs, become enormous. For example, if information of 10,000 music pieces is to be stored into the database, the human subjects have to be asked to listen to the 10,000 music pieces, and constructing the database in this manner is extremely impractical. Further, each time the contents of the database are to be updated (e.g., a new music piece is to be added or search condition is to be added for an already-registered music piece), a human subject has to be asked to listen to and evaluate the music piece, so that there would be encountered the inconvenience that registering music pieces newly presented to the public (or published) on a daily basis tends to be extremely cumbersome and troublesome.

SUMMARY OF THE INVENTION

In view of the foregoing, it is an object of the present invention to provide a technique for constructing a music information database which permits a music information search therethrough using an impression word representing an impression of a music piece, at low cost without taking much time and labor.

In order to accomplish the above-mentioned object, the present invention provides an improved database constructing apparatus, which comprises: a database that registers, for a plurality of music pieces, a list where the music pieces and words representing impressions of the music pieces are associated with each other, the words being used as search words when any of the music pieces is to be searched for; an information collection section that connects to a communication network to access any one of a plurality of sites on the communication network and collect, from among information being provided by the accessed site, a word usable as a music-piece-related search word in association with a particular music piece; and a registration section that registers the word, collected by the information collection section in association with the particular music piece, into the database in association with the particular music piece.

In constructing a database comprising a list where music pieces and words representing impressions of the music pieces are associated with each other, the present invention allows words usable as music-piece-related search words to be collected from the plurality of sites on the communication network in association with particular music pieces and then accumulated or cumulatively stored into the database. Thus, with the present invention, information of impression words of a multiplicity number of music pieces can be cumulatively stored into the database at low cost without much time and labor required.

In an embodiment, the list in the database has a plurality of search items for classifying genre by genre words (impression words) representing impressions of music pieces. The information collection section has a dictionary where the plurality of search items and words corresponding to the search items are stored in association with each other, and, with reference to the dictionary, the information collection section collects, from among the information being provided by the accessed site, a word corresponding to any one of the plurality of search words.

In another embodiment, the list registered in the database has a plurality of search items for classifying genre by genre words (impression words) representing impressions of music pieces, and the information collection section collects words of particular types, conditioned by the plurality of search words, as words usable as search words.

By the database having the plurality of search items for classifying genre by genre the impression words included in the music information, the impression words usable as search words can be conditioned or narrowed in advance by the search items. Thus, the present invention is advantageous in that it can reduce unwanted noise in collecting, form the information sources (i.e., information source sites) on the communication network, subjective and sensory information of impression words representing impressions of music and can thereby permit efficient information collection and database construction.

In an embodiment, the sites are Web sites having music-related information published thereon. By collecting information from music comments and impressions of music pieces appearing (or published) on various information source sites present on the communication network, the present invention achieves the advantageous benefit that impression evaluation, having reflected therein various opinions of various persons regarding a multiplicity of music pieces, can be reflected in the music information database The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which:

FIG. 4A is a diagram showing an example of a text provided by an information source to be cruised in the process shown in FIG. 3, and FIG. 4B is a diagram explanatory of a process for extracting information from the information source shown in FIG. 4A.

DETAILED DESCRIPTION

Figures 1, 2:
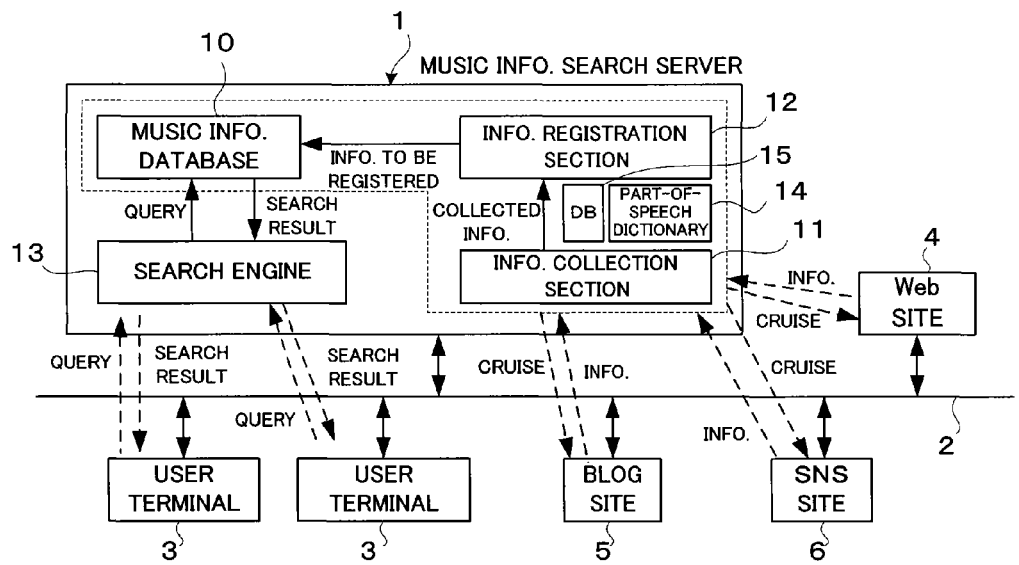
FIG. 1 is a block diagram showing a general setup of a network including a music information search server to which is applied a database constructing apparatus in accordance with an embodiment of the present invention.
FIG. 2 is a diagram showing an example of music information accumulated or cumulatively stored in the music information database.

FIG. 1 is a block diagram showing a general setup of a network including a music information search server to which is applied a database constructing apparatus according to an embodiment of the present invention. The music information search server 1 is connected to a communication network 2 including a public telephone network, Internet, LAN and the like, and it comprises a server computer that provides a music information search function to any one of user terminals 3 having accessed the server 1 via the communication network 2. The user terminal 3 may be any conventionally-known terminal apparatus as long as it can communicate with the music information search server 1 via the communication terminal 2 to use the search function performed by the server 1, i.e. as long as it includes at least a Web browser, a display for displaying information, acquired from a server on the communication network 2 to the user and an input device for an user to enter a search condition. For example, the user terminals 3 may be general-purpose personal computers, communication terminal apparatus like portable telephones an PDAs, and electronic musical instruments connectable to the communication network 2. Further, one or more computers, opening various Web sites to the public, are connected to the communication network 2, and each of the various Web sites receives accesses from other computers connected to the communication network 2. The various Web sites include various types of sites, such as an ordinary Web site 4 comprising Web pages published or provided on the Internet, blog site 5 and SNS (Social Networking Services) site 6. These Web site 4, blog site 5 and SNS site 6 can each be generically referred to as an information source.

The music information search server 1 includes a music information database 10, an information collection section 11, an information registration section 12 and a search engine 13. In the instant embodiment, these components of the music information search server 1 are constructed and implemented by a software program executed by a computer. In FIG. 1, the music information database 10, information collection section 11 and information registration section 12, surrounded by a dotted-line block, together constitute the "database constructing apparatus". The music information database 10 is a database having registered therein items of music information (search list) in which a plurality of music pieces and impression words representing impressions of the music pieces and suited for use as search words in searching for the music pieces, are associated with each other. Detailed construction of the music information database 10 will be later described with reference to FIG. 2.

The information collection section 11 cruises the information sources (information source sites) on the communication network 2, such as the Web site 4, blog site 5 and SNS site 6, and collects information necessary for constructing the music information database 10 from among various information, such as documents published on the cruised Web sites. The "information sources" are Web sites publishing music-related information necessary for constructing the music information database 10. The "information necessary for constructing the music information database 10" will be detailed later. The information registration section 12 performs a process for registering the information collected by the information collection section 11 into the music information database 10.

Further, the search engine 13 is a module that receives a search request (query) from any one of the user terminals 3, searches the music information database 10 on the basis of the received search request and returns the result of the search to the user terminal 3 having transmitted the query. The "query" is data that designates a search condition for searching for desired music information and giving a search request, based on the search condition, to the music information database 10. The search function of the music information search server 1 in the instant embodiment uses, as the search condition, one or more impression words representing impressions of music.

FIG. 2 is a diagram showing an example of the music information (search list) stored in the music information database 10. In the database 10, a record of one music piece is registered in each of a plurality of rows, and information indicative of the title and artist's name of a music piece and information indicative of search words, classified according to a plurality of (four in the illustrated example) predetermined search categories or items, is registered in each of a plurality of columns. Namely, the music information of each music piece comprises information that identifies the music piece by the music title and artist's name, and information of search words classified according to the four search categories or items. Here, words registered as search words of individual music pieces are impression words representing impressions of the music pieces.

In FIG. 2, "music piece 1", "music piece 2", . . . , "music piece N" are the titles of the music pieces, and "artist 1", "artist 1", . . . , "artist M" are the artist's names of the music pieces. The artist's names may each be any type of information as long as the information identifies the music piece by the name of a person or (group), such as the name of the singer or player (or player's group).

The above-mentioned plurality of search items are items for classifying by genre impression words to be registered as search words of various music pieces. The genres of the search items are high-order categories that classify the impression words, which are to be used as search words, by their concept or meaning. In the instant embodiment, four genres, "scene", "season", "tome zone" and "feeling", are set as examples of the search items. Impression words corresponding to the genres of the search items are registered as search words of each of music pieces. For example, words classified as seasons, such as "spring", "summer", "autumn" and "winter", are registered in the search item "season". Thus, the impression words usable in the database 10 as search words of the individual music pieces are conditioned by words corresponding to any of the genres of the four search items. Thus, the impression words usable as search words of the individual music pieces may be any types of parts of speech (noun, adjective, verb, etc.) as long as they are words corresponding to any of the genres of the four search items.

Namely, in the instant embodiment, impression words are registered as search words of the individual search items for each of the music pieces in the music information database 10, to thereby define the search words for the individual music pieces. In this way, any particular music piece matching one or more impression words (search words) entered by a user as a search condition can be searched for and extracted from the database 10. In FIG. 2, as search words for "music piece 1", for example, "drive" and "date" are registered in the search item "scene", "summer" is registered in the search item "search", "evening" is registered in the search item "time zone", and "comfortable" is registered in the search item "feeling". Namely, if a search is made through the database 10 of FIG. 2 in response to the user of the music information search server 1 entering, as a search condition, any one or more of the impression words "drive", "date", "summer", "evening" and "comfortable", "music piece 1" will be presented as the result of the search.

In order to construct such a music information database 10, it is necessary to register in advance impression words to be used as search words of individual ones of a multiplicity of music pieces. According to the instant embodiment of the present invention, the information collection section 11 cruises the information sources on the communication network 2, and items of information collected, for example, from documents being published on the cruised web sites are used as the search words to be registered in the individual search items of the music pieces on the communication network 2. Namely, the information collection section 11 collects, from the information sources on the communication network 2, words (impression words) matching any of the four search words "scene", "season", "time zone" and "feeling", and then the information registration section 12 accumulates or stores the items of information (music information in which music pieces and impression words related to the music pieces are associated with each other) into the music information database 10; in this manner, the music information database 10 can be automatically constructed.

Figure 3:
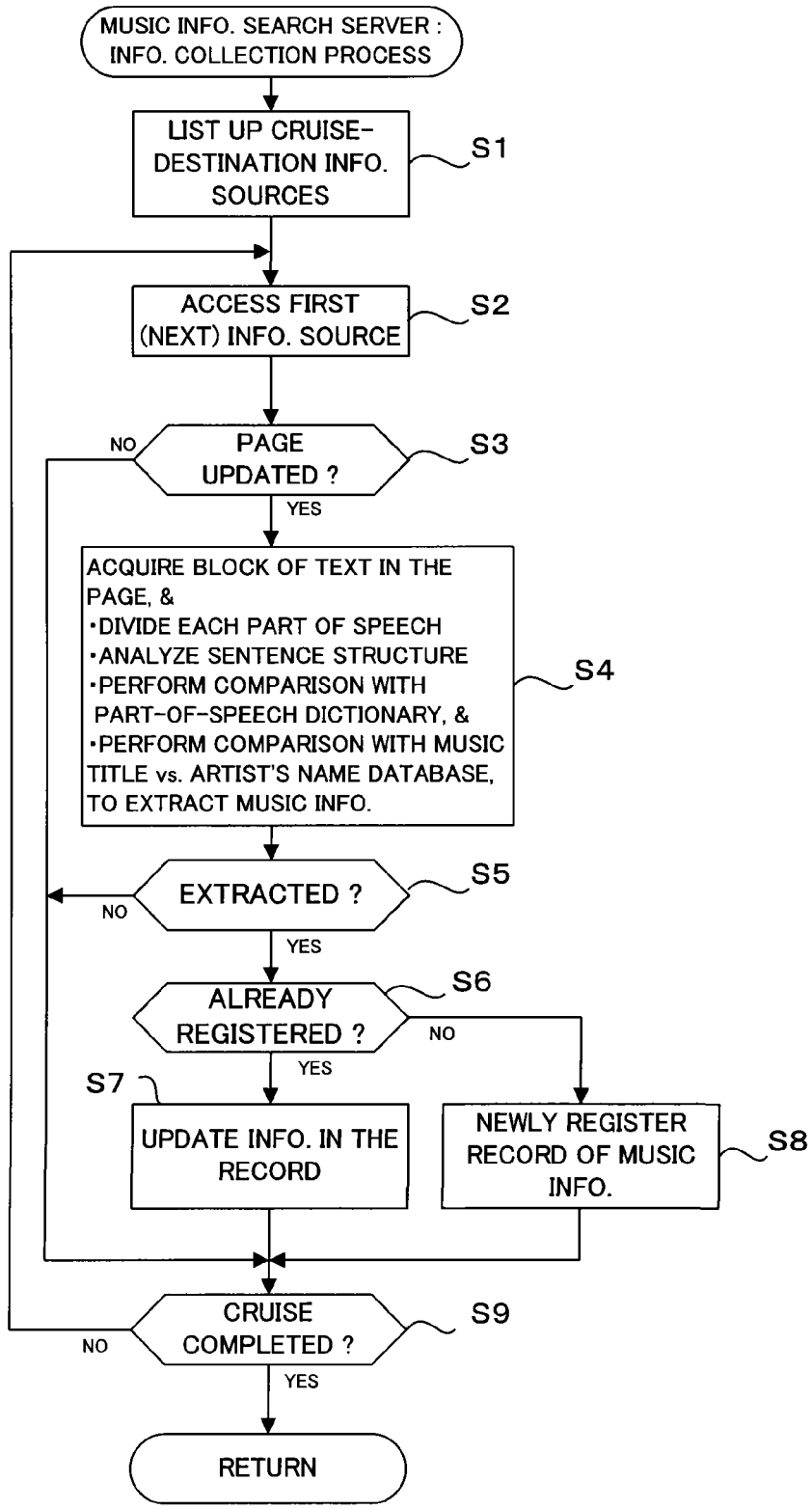
FIG. 3 is a flow chart showing an example operational sequence of a process for constructing the music information database shown in FIG. 1.

FIG. 3 is a flow chart showing an example operational sequence of a process for constructing the music information database 10, and this database constructing process is performed by the information collection section 11 and information registration section 12 shown in FIG. 1. The opportunity at which the database constructing process is started up corresponds to the opportunity at which the information collection section 11 cruises the information sources on the communication network 2; for example, the information collection section 11 cruises the information sources at suitable periodic intervals, e.g. once a day. Alternatively, an administrator of the database 10 may manually instruct such a cruise.

At step S1, information sources (Web site 4, blog site 5 and SNS site 6), which are presumed to be providing information related to music pieces to be stored into the database 10, are listed up as cruise-destination information sources. The Web site 4, blog site 5 and SNS site 6, providing music-related items of information like music comments and impressions of music pieces, are suited as the cruise-destination information sources. These sites may be sites where either music experts (such as professional musicians and critics) or non-specialists (ordinary persons) are providing musical impressions and evaluations. As one example way of listing up the cruise-destination information sources, a Web site search engine may be used to search through Web sites with search words, such as "music piece" and "recommended", to extract and list up music-related web sites (Web site 4, blog site 5 and SNS site 6) as cruise-destination information sources. It is preferable to prepare in advance the list of cruise-destination information sources and update the list at a suitable frequency.

The information collection section 11 sequentially accesses the listed-up information sources at step S2 and extracts necessary information from the accessed information sources at steps S3 and S4. Namely, the information collection section 11 determines, for each of the cruise-destination information sources (information source sites), whether a Web page constituting the site has been updated since the last cruise, and if so (YES determination at step S3), the information collection section 11 goes to step S4 to acquire a block of data, such as a text, published on the updated Web page and extract necessary information from among the acquired data. In this case, parts of speech present in a suitable block of the acquired text are extracted in the following manner, and then the extracted parts of speech are associated with one another in the text block.

FIG. 4A is a diagram showing an example block of a text published on a Web page of a information source (Web site 4, blog site 5 or SNS site 6). FIG. 4B is a diagram explanatory of a process for extracting information from the Web page shown in FIG. 4A. The Web page shown in FIG. 4A is a page where users of the page supply and view information related to desired music pieces, and which contains the titles ("bbbb", "dddd" and "fffff" in the figure), artist's names ("AAAA", "CCCC" and "EEEE" in the figure) of music pieces and impression words ("winter", "drive" and "lively" in the figure) expressing impressions of some of the music pieces.

At step S4 above, (1) an operation is performed for dividing individual parts of speech from one another in the text of the Web page, as the operation for extracting necessary information from the Web page acquired from the cruised destination; in FIG. 4B, the parts of speech, constituting the Web page shown in FIG. 4A, are shown as divided from one another with vertical lines, (2) an operation is performed for analyzing the sentence structure of the Web page, (3) an operation for finding parts of speech, which match the individual search items of the database 10, from among the divided parts of speech with reference to a later-described part-of-speech dictionary, and then (4) an operation is performed for finding the titles and artist's names from the divided parts of speech with reference to data stored in a later-described music title vs. artist's name database where music titles and artist's names are associated with each other.

The above-mentioned part-of-speech dictionary is a dictionary or data table where words corresponding to the search items of the music information database 10 are stored in association with the search items. This part-of-speech dictionary is indicated at reference numeral 14 in FIG. 1, and let it be assumed that the part-of-speech dictionary 14 is provided in advance in a suitable memory (for example, ROM, RAM, flash memory, or external storage device, such as a hard disk) of the computer constituting the music information search server 1. By reference to the part-of-speech dictionary 14, only words classifiable to any one of the search categories or items of the music information database 10 can be extracted from the various parts of speech constituting the text of the Web page. In the instant embodiment, such classifiable words are words corresponding to any one of the four search categories or items, "scene", "season", "time zone" and "feeling".

Further, the above-mentioned "music title vs. artist's name database" is a database in which the titles of music pieces existing in the world and the artist's names of the music pieces are stored in association with each other. This music title vs. artist's name database is shown as "DB" at reference numeral 15 in FIG. 1. It is preferable that the music title vs. artist's name database be updated as frequently as possible in order to cover the titles and artist's names of not only music pieces already existing in the world but also music pieces newly created on a day-to-day basis. By reference to the music title vs. artist's name database, titles and artist's names can be extracted from the various parts of speech constituting the sentence structure of the Web page.

Thus, parts of speech, which match the individual search items of the database 10 can be extracted by the aforementioned (3) operation, the titles and artist's names can be extracted from the divided parts of speech by the aforementioned (4) operation, and the extracted parts of speech matching the individual search items can be associated with the extracted titles and artist's names through the sentence structure analysis of the Web page at item (2) above. In this way, the extracted parts of speech can have meanings as impression words evaluating impressions of the music pieces identified by the respective extracted music titles and artist's names. Namely, from one block of the information appearing on the Web page of the cruise destination, it is possible to extract music information in which a given music piece and impression words evaluating impressions of the music piece are associated with each other. Here, the impression words included in the extracted music information are limited to words stored in the part-of-speech dictionary 14, in other words, to words matching any one of the above-mentioned four search items, "scene", "season", "time zone" and "feeling". Therefore, impression words registered into the database 10 through later-described processing are conditioned or narrowed in advance by the four search items. In the case where items of information to be extracted are subjective and sensory impression words representing impressions of music as in the above-described embodiment, the aforementioned novel feature of pre-defining words to be extracted by the plurality of search items is very advantageous in that it can reduce undesired noise in extracting information from Web pages and can thereby achieve efficient information collection.

In FIG. 4B, the parts of speech corresponding to the information to be extracted from the Web page of the cruise destination are shown in a greater size than the other characters and letters. From the Web page shown in FIG. 4B, the part of speech "drive" matching the search item "scene" and part of speech "winter" matching the search item "season" can be extracted for the music piece of title "bbbb" and artist's name "AAAA", the part of speech "drive" matching the search item "scene", part of speech "winter" matching the search item "season" and part of speech "lively" matching the search item "scene", part of speech "lively" matching the search item "feeling" can be extracted for the music piece of title "dddd" and artist's name "CCCC", and the part of speech "drive" matching the search item "scene", part of speech "winter" matching the search item "season" and part of speech "lively" matching the search item "feeling" can be extracted for the music piece of title "fffff" and artist's name "EEEE".

Referring back to FIG. 3, if music information has been extracted at step S4 (YES determination at step S5) and the extracted music information pertains to a music piece (music title) already registered in the database 10 (YES determination at step S6), the information registration section 12 performs an operation at step S7 for additionally writing impression words, included in the extracted music information, as search words of the corresponding search items in the record of the music piece in the music information database 10. If the impression words included in the extracted music information have already been registered as search words of the corresponding search items, there is no need to additionally write the impression words, namely, the record of the music piece need not be updated. Alternatively, if the extracted impression words have already been registered in the record of the music piece, information indicative of a frequency at which each of the impression words of the music piece has been referred to (i.e., impression word reference information) may be recorded so that the impression word reference information is reflected in later-described search processing (e.g., an impression word having a higher reference frequency may be put at a higher position in a search result).

If, on the other hand, the extracted music information pertains to a music piece (music title) not yet registered in the database 10 (NO determination at step S6), the information registration section 12 at step S8 newly creates a record of the music piece (music title) and registers the impression words, included in the extracted music information, as search words of the corresponding search items of the created record.

Through the aforementioned operations, a search word is registered per search item for each music piece in the music information database 10. By performing the aforementioned operations for all of the cruise-destination information sources (step S9), information indicative of music pieces and impression words evaluating impressions of the music pieces can be automatically collected from a multiplicity of information sources, such as the Web site 4, blog site 5 and SNS site 6, present on the communication network 2, and the thus-collected information can be automatically registered into the music information database 10. As a result, the instant embodiment can accumulate or store information indicative of a multiplicity of music pieces and search words (impression words) of the music pieces into aforementioned music information database 10 at low cost without taking much time and labor.

Figure 5:
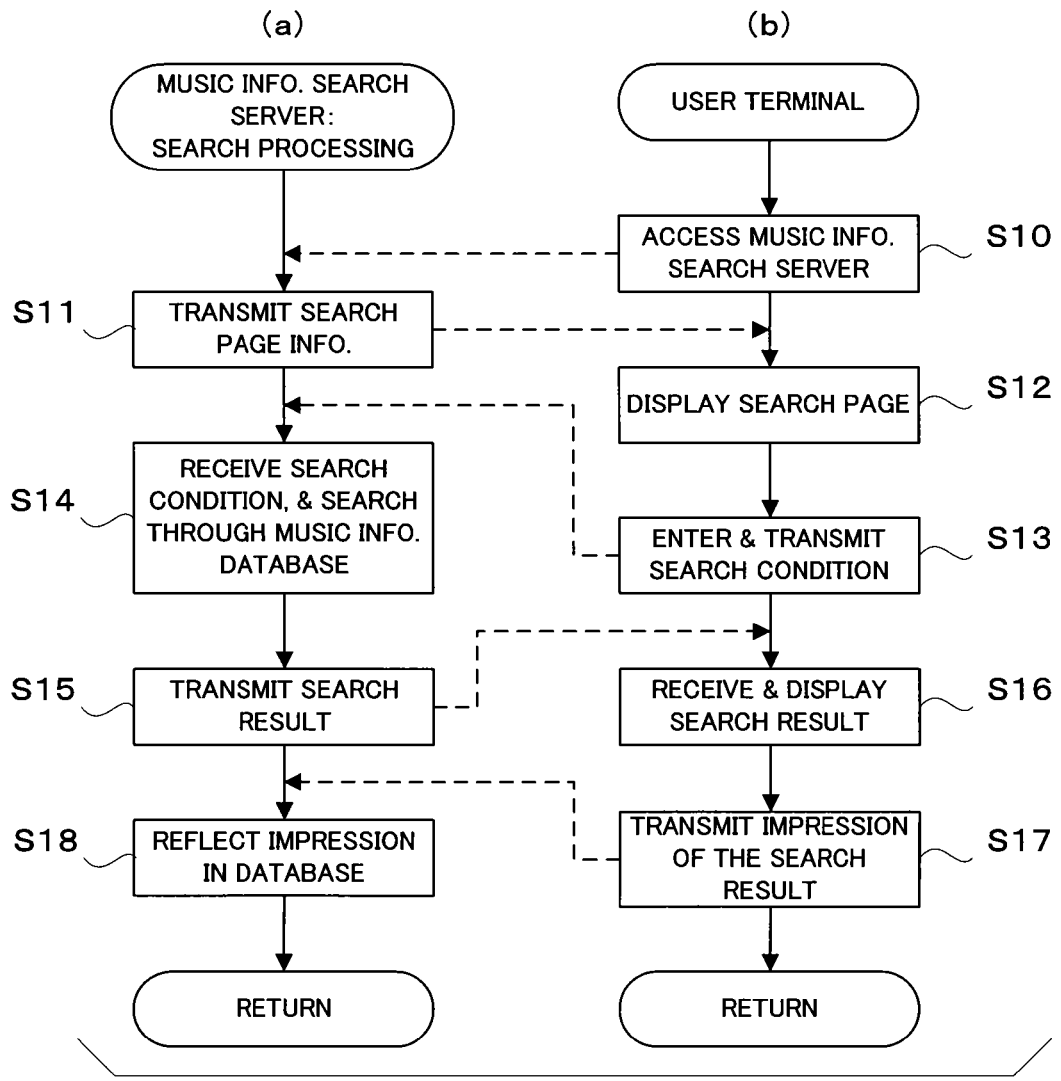
FIG. 5 is a flow chart showing an example operational sequence of music information search processing performed, by the music information search server shown in FIG. 1, for searching for and extracting music information from the music information database, where (a) shows a flow of operations performed by the music information search server and (b) shows a flow of operations performed by a user terminal.

Next, with reference to a flow chart shown in (a) and (b) FIG. 5, a description will be given about an example operational sequence of the search processing for searching for and extracting music information from the music information database 10. (a) of FIG. 5 shows behavior of the music information server 1, while (b) of FIG. 5 shows behavior of one of the user terminals 3.

Once the user of the user terminal 3 accesses the music information server 1 via its user terminal 3 at step S10, search page (Web page) information is transmitted from the music information server 1 to the user terminal 3 at step S11. Then, a search page for the user to use the search function provided by the music information server 1 is displayed, at step S12, on a display device of the user terminal 3 on the basis of the transmitted search page information. The search page has an entry field for the user to enter a search condition. A plurality of the search condition entry fields may be provided in corresponding relation to a plurality of search categories or items so that the user can enter search words, corresponding to the search items, to the respective entry fields. Alternatively, only one such search condition entry field may be provided so that the user can enter into the field a search word corresponding to any one of the search item. Further, per desired search, the user may either enter one or more separate search words into one or more respective search items, or enter a plurality of search words for each or any desired one of the search items. The entry of each search word may be executed by the user entering a desired character or letter string via a keyboard, or by the user selecting a desired search word from a selection menu that lists a group of enterable search words. Here, each search word enterable as a search condition is an impression word that represents an impressions of a user-desired music piece and corresponds to any one of the above-mentioned four search items, "scene", "season", "time zone" and "feeling". Because the search words to be entered by the user are conditioned or narrowed in advance by the plurality of search items as noted above, the search condition, which is in the form of subjective and sensory impressions of the user-desired music piece and thus may become vague, can be narrowed down to words within a limited range (i.e., range conditioned by the search items). Such a novel feature is advantageous in that it can reduce undesired search-related noise and can achieve an efficient search.

Once a search request (query) based on the user-entered search condition is transmitted from the user terminal 3 to the server at step S13, the search engine 13 of the search server 1 performs an operation for searching through the music information database 10 for music information of any music piece matching the transmitted search condition, at step S14. In the instant embodiment, an algorithm for finding such music information of any music piece matching the transmitted search condition is designed, for example, to: (1), if the entered search condition contains only one search word, extract from the music information database 10 music information of all music pieces having the one search word registered therefor; (2) if the entered search condition contains two or more search words, extract from the music information database 10 not only music information of all music pieces having all of the search words registered therefor but also music information of all music pieces having at least one of the search words registered therefor; and (3), if the music information database 10 has no music information of any music piece having registered therefor the one or more search words included in the entered search condition, extract from the music information database 10 music information of all music pieces having registered therefor search words similar to any one of the entered search words. Here, the "search word similar to any one the entered search words" is a word which evokes an impression that is of a similar type to an impression evoked by the entered search word and thus classifiable to the same search item as the entered search word.

The music information search server 1 transmits the result of the search, made at step S14, to the user terminal 3 at step S15. The transmitted result is displayed on the display of the user terminal 3 at step S16; in this way, the result of the search, made through the music information database 10 in accordance with the search condition, is displayed to the user. The result of the search thus presented to the user may be the title or artist's name of the music piece matching the user-entered search condition. At that time, other information may also be displayed or presented to the user which indicates to what degree the result of the search has matched (or has failed to match) the search condition, e.g. "has completely matched the search condition" or "has matched the search condition only in terms of the search item 'scene'".

Further, any impression of the result of the search presented to the user may also be received from the user at step S17 so that the impression of the result of the search can be reflected in the music information database 10 at step S18. For this purpose, GUI components for entering user's evaluation of the result of the search (e.g., radio buttons for selecting "satisfied with the result of the search" or "not satisfied with the result of the search", or a radio button for selecting "YES" or "NO" as to whether or not the result of the search has helped the user) may be provided on the Web page displaying the result of the search. Alternatively or in addition to the above, the Web page may include a field for the user to enter a comment on the result of the search.

Further, the user's impression of the result of the search may be reflected in the music information database 10 in the following manner. Namely, music piece priority data may be recorded such that, if the user highly evaluates the result of the search (e.g., if the user feels that the presented music piece duly matches the entered search condition), the music piece, presented as the result of the current search in response to the current entered search condition, is given high priority so as to be extracted easily at and after the next search and that, if the user unfavorably evaluates the result of the search (e.g., if the user feels that the presented music piece does not match the entered search condition), the music piece, presented as the result of the current search in response to the current entered search condition, is given low priority so as not to be extracted easily at and after the next search. Alternatively, information indicative of an evaluation point may be added to each of the search word registered per music piece in the database 10. In this case, music pieces may be presented in decreasing order of the evaluation points regarding a search word included in a user-entered search condition at the time of the next search, and the evaluation point regarding the search word included in the user-entered condition may be increased if the user's evaluation of the result of the search is high while the evaluation point may be decreased if the user's evaluation of the result of the search is low. Reflection of the user's impression in the music information database 10 in any of the aforementioned two schemes may be carried out separately for each of the user terminals 3 (users) having returned the impression, or the impression of any one of the users may be reflected as an impression of all of the users.

Further, parts of speech contained in a comment on the result of the search, received from the user, may be registered in the database 10. For example, if an impression "I have been made to feel pleasant" has been received from the user regarding a given music piece, "pleasant" included in the received impression can be added as a search word to the search item "feeling" in the record of the given music piece. By adding such a novel search word on the basis of the user's comment on the result of the search, the new impression received from the user can be reflected in the music information database 10. The way of reflecting a user's impression has been described above just by way of an illustrated example, and thus it should not be construed as limited to the aforementioned.

The search processing of FIG. 5 has been described above as designed to cause the user terminal 3 to display search results (title and artist's name of each searched-out music piece) at step S16 and then receive a user's impression at step S17 before ending the processing. In an alternative, however, the operation for receiving a user's impression at step S17 and the operation for reflecting the received user's impression in the music information database 10 may be dispensed with, because, even in this case, the search processing of FIG. 5 can work appropriately. In another alternative, a service for allowing the user to listen or test-listen to the searched-out music piece data, i.e. music piece data of the music piece presented as the result of the search, (such as audio data, MIDI data, or musical score data) (e.g., audio data streaming delivery service) and a service for selling the searched-out music piece data to the user by downloading (music-piece-data download selling service) or in a physical storage medium, such as a music CD, may be provided to the user after the result of the search is presented to the user terminal 3. In such a case, the music information search server 1 may be constructed to provide a service for allowing the user to listen or test-listen to the searched-out music piece data and a service for selling the searched-out music piece data to the user. Alternatively, the music information search server 1 may be constructed to provide the user with a link to a site which allows the user to listen or test-listen to the music piece data of the music piece presented as the result of the search. Namely, the music information search server 1 may be either a server managing the service for providing the music information search function to the user, or a server for managing the service for providing the music information search function to the user and also providing music piece data corresponding to the result of the search.

Namely, the above-described embodiment is constructed to automatically collect information indicative of music pieces and impression words, evaluating impressions of the music pieces, from a multiplicity of information sources on the communication network 2, such as the Web site 4, blog site 5 and SNS site 6, and automatically register the thus-collected information into the music information database 10. With such an arrangement, the above-described embodiment can accumulate information of a multiplicity of music pieces and search words of the music pieces (i.e., impression words representing impressions of the music pieces) into the music information database 10 at low cost without taking the trouble of asking human subjects to evaluate impressions of the music pieces. Thus, the above-described embodiment affords the superior benefit that it can efficiently construct the music information database 10 through which each user can search for any desired music information using words representing impressions of the corresponding music piece. Further, because the music information database 10 has four search categories or items for classifying the search words of each music piece genre by genre, the impression words usable as the search words can be appropriately conditioned or narrowed in advance; namely, impression words corresponding to none of the search items can be prevented from being registered as search words. Therefore, the above-described embodiment can advantageously reduce undesired noise in collecting, form the information sources 4, 5 and 6 on the communication network 2, subjective and sensory information of impression words representing impressions of music and can thereby permit efficient information collection and database construction. Further, because the search words of each of the music pieces thus registered in the music information database 10 are classified genre by genre in accordance with the search items, the above-described embodiment can advantageously reduce undesired search noise due to vagueness of entered search words in searching through the database 10, thereby permitting efficient searches. Further, because the instant embodiment can collect information of search words to be registered into the music information database 10 from music comments and impressions of music pieces appearing in the information sources 4, 5 and 6 present on the communication network 2, impression evaluation having reflected therein various opinions of various persons regarding a multiplicity of music pieces can be reflected in the music information database 10.

Further, according to the method of the invention for constructing a music information database 10, the database 10 may be initially constructed by requesting various human subjects, such as music experts like professional musicians and critics, to listen to a plurality of suitable music pieces and then set, per music piece, search words suited for the individual search items. After that, the database 10 may be placed in an operating condition after having registered records of a given number of music pieces in the aforementioned manner, and then the contents of the database 12 may be automatically expanded or updated by the information collection section 11 and information registration section 12 collecting information from the information sources on the communication network 2 and automatically accumulating the collected information. Because the music experts are requested to evaluate impressions of a certain number of the music pieces so as to register search words on the basis of the impression evaluation at the initial stage, users can be assured of high reliability of the information stored in the database 10. By the information collection section 11 and information registration section 12 thereafter collecting information from the information sources on the communication network 2 and cumulatively registering the collected information into the database 10 in accordance with the present invention, it is possible to store information about an enormous number of music pieces into the database 10 without relying only upon music experts.

Whereas the preferred embodiment has been described above as setting the four search items, "scene", "season", "time zone" and "feeling", in the music information database 10, any other suitable search items may be set as long as impression words to be used as the search words can be classified genre by genre in accordance with the search items.

Furthermore, whereas the preferred embodiment has been described above in relation to the case where the database constructing apparatus (music information database 10, information collection section 11 and information registration section 12) of the present invention is constructed and implemented as a plug-in effect, the present invention is not so limited; for example, the music information database 10, information collection section 11 and information registration section 12 may be constructed and implemented as hardware devices and a signal processing circuit implementing their respective operation, or may be constructed and implemented as microprograms executed by a processor, such as a DSP.

This application is based on, and claims priority to, JP PA 2007-74541 filed on 22 Mar. 2007. The disclosure of the priority application, in its entirety, including the drawings, claims, and the specification thereof, is incorporated herein by reference.

What is claimed is:

1. A database constructing apparatus comprising:
a storage device storing a database that registers names of a plurality of music pieces, each name in association with at least one word representing an impression of the associated name of the respective music piece, the words being used as search words when any of the names of the music pieces is to be searched for; and
a processor programmed to:
connect to a communication network to access any one of a plurality of sites on the communication network and collect, from among text information being provided by the accessed site, a word usable as a music-piece-related search word in association with a name of a particular music piece, without collecting the particular music piece; and
register the collected word in association with the name of the particular music piece, into the database.

2. The database constructing apparatus as claimed in claim 1, wherein:
the list in the database has a plurality of search items for classifying genre by genre words representing impressions of music pieces, and
wherein the storage device further stores a dictionary where the plurality of search items and words corresponding to the search items are stored in association with each other, and, with reference to the dictionary, the processor is programmed to collect, from among the information being provided by the accessed site, a word corresponding to any one of the plurality of search words.

3. The database constructing apparatus as claimed in claim 1, wherein:
the list registered in the database has a plurality of search items for classifying genre by genre words representing impressions of music pieces, and
the processor is programmed to collect words of particular types, conditioned by the plurality of search words, as words usable as search words.

4. The database constructing apparatus as claimed in claim 1, wherein the sites are Web sites having music-related information published thereon.

5. The database constructing apparatus as claimed in claim 1, wherein the processor is programmed to connect to the communication network at predetermined intervals to access any of the plurality of sites on the communication network and thereby collect the word usable as a music-piece-related search word.

6. The database constructing apparatus as claimed in claim 1, wherein:
the storage device also stores a music title database having a multiplicity of music titles stored therein, and
the processor is programmed to refer to the music title database to not only extract the word usable as a music-piece-related search word from among information being provided by the accessed site but also extract a music title from among the music titles stored in the music title database, to thereby collect the extracted word, usable as a music-piece-related search word, in association with the extracted music title.

7. The database constructing apparatus as claimed in claim 6, wherein:
if the extracted music title is already registered in the list of the database, the processor is programmed to additionally register, into the list of the database, the word collected in association with the extracted music title, and
if the extracted music title is not yet registered in the list of the database, the processor is programmed to newly register the extracted music title into the list of the database and register the word, collected in association with the extracted music title, into the list of the database.

8. The database according to claim 1, wherein:
the text information comprises a sentence structure of text,
the processor is programmed to analyze the sentence structure and extract an impression word, and
the collected word comprises the impression word.

9. The database according to claim 1, wherein:
the text information comprises a sentence structure of text,
the processor is programmed to analyze the sentence structure and extract an impression word and the name of the respective music piece, and
the collected word comprises the impression word.

10. A computer-implemented method for constructing a database, the method comprising:
a step of providing a storage device storing a database that registers names of a plurality of music pieces, each name in association with at least one word representing an impression of the associated name of the respective music piece, the words being used as search words when any of names of the music pieces is to be searched for;
a collection step of connecting to a communication network to access any one of a plurality of sites on the communication network and collecting, from among text information being provided by the accessed site, a word usable as a music-piece-related search word in association with a name of a particular music piece, without collecting the particular music piece; and a step of registering the word, collected in the collection step, in association with the name of the particular music piece, into the database.

11. The method according to claim 10, wherein:
the text information comprises a sentence structure of text,
the collecting step includes analyzing the sentence structure and extracting an impression word, and
the collected word comprises the impression word.

12. The method according to claim 10, wherein:
the text information comprises a sentence structure of text,
the collecting step includes analyzing the sentence structure and extracting an impression word and the name of the respective music piece, and
the collected word comprises the impression word.

13. A non-transitory computer-readable storage medium storing a group of instructions executable by a computer to:
construct a database that registers names of a plurality of music pieces, each name in association with at least one word representing an impression of the associated name of the respective music piece, the words being used as search words when any of the names of the music pieces is to be searched for;
connect to a communication network to access any one of a plurality of sites on the communication network and collecting, from among text information being provided by the accessed site, a word usable as a music-piece-related search word in association with a name of a particular music piece, without collecting the particular music piece; and
register the collected word in association with the name of the particular music piece, into the database.

14. The non-transitory computer-readable storage medium according to claim 13, wherein:
the text information comprises a sentence structure of text,
the collecting step includes analyzing the sentence structure and extracting an impression word, and
the collected word comprises the impression word.

15. The non-transitory computer-readable storage medium according to claim 13, wherein:
the text information comprises a sentence structure of text,
the collecting step includes analyzing the sentence structure and extracting an impression word and the name of the respective music piece, and
the collected word comprises the impression word.

16. A music information search apparatus comprising:
a storage device storing a database that registers names of a plurality of music pieces, each name in association with at least one word representing an impression of the associated name of the respective music piece, the words being used as search words when any of the names of the music pieces is to be searched for; and
a processor programmed to:
connect to a communication network to access any one of a plurality of sites on the communication network and collect, from among text information being provided by the accessed site, a word usable as a music-piece-related search word in association with a name of a particular music piece, without collecting the particular music piece;
register the collected word in association with the name of the particular music piece, into the database; and
searches through the database on the basis of a search word entered via a user terminal and returns a search result, corresponding to the entered search word, to the user terminal.

17. The music information search apparatus according to claim 16, wherein:
the text information comprises a sentence structure of text,
the processor is programmed to analyze the sentence structure and extract an impression word, and
the collected word comprises the impression word.

18. The music information search apparatus according to claim 16, wherein:
the text information comprises a sentence structure of text,
the processor is programmed to analyze the sentence structure and extract an impression word and the name of the respective music piece, and
the collected word comprises the impression word.

19. A non-transitory computer-readable storage medium storing a group of instructions executable by a computer to:
construct a database that registers names of a plurality of music pieces, each name in association with at least one word representing an impression of the associated name of the respective music piece, the words being used as search words when any of the names of the music pieces is to be searched for;
connect to a communication network to access any one of a plurality of sites on the communication network and collecting, from among text information being provided by the accessed site, a word usable as a music-piece-related search word in association with a name of a particular music piece, without collecting the particular music piece;
register the collected word in association with the name of the particular music piece, into the database; and
search through the database on the basis of a search word entered via a user terminal and returning a search result, corresponding to the entered search word, to the user terminal.

20. The non-transitory computer-readable storage medium according to claim 19, wherein:
the text information comprises a sentence structure of text,
the collecting step includes analyzing the sentence structure and extracting an impression word, and
the collected word comprises the impression word.

21. The non-transitory computer-readable storage medium according to claim 19, wherein:
the text information comprises a sentence structure of text,
the collecting step includes analyzing the sentence structure and extracting an impression word and the name of the respective music piece, and
the collected word comprises the impression word.

* * * * *